Figure 1:
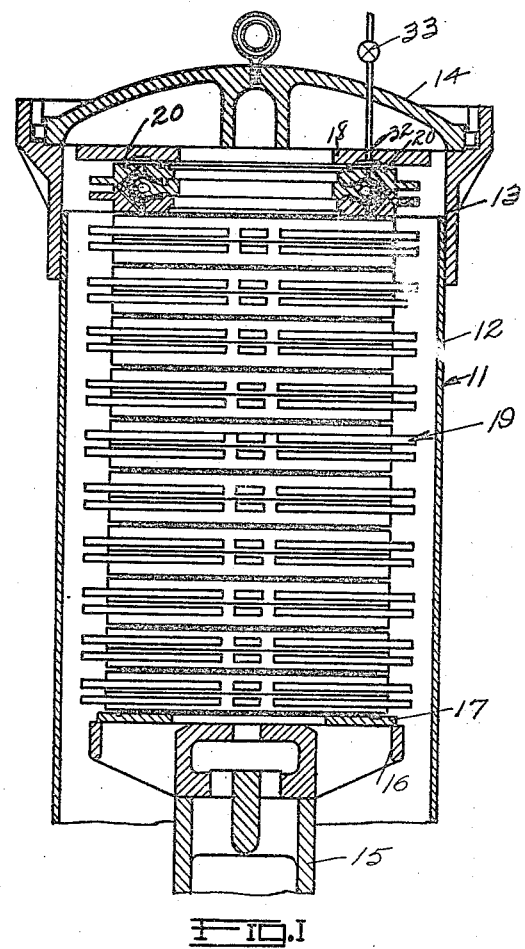

Sept. 30, 1924.

D. E. HENNESSY

VULCANIZING APPARATUS

Original Filed Aug. 19, 1921   2 Sheets-Sheet 1

1,510,276

DANIEL E. HENNESSY
INVENTOR

BY *Hadley Freeman*
ATTORNEY

Sept. 30, 1924.

D. E. HENNESSY 1,510,276

VULCANIZING APPARATUS

Original Filed Aug. 19, 1921    2 Sheets-Sheet 2

DANIEL E. HENNESSY
INVENTOR

BY Hedley Freeman
ATTORNEY

Patented Sept. 30, 1924.

1,510,276

UNITED STATES PATENT OFFICE.

DANIEL EDWARD HENNESSY, OF MILWAUKEE, WISCONSIN.

VULCANIZING APPARATUS.

Application filed August 19, 1921, Serial No. 493,592. Renewed February 27, 1924.

*To all whom it may concern:*

Be it known that I, DANIEL EDWARD HENNESSY, a citizen of the United States, and a resident of Milwaukee, in the county of Milwaukee and State of Wisconsin, have invented certain new and useful Improvements in Vulcanizing Apparatus, of which the following is a specification.

Figure 2:
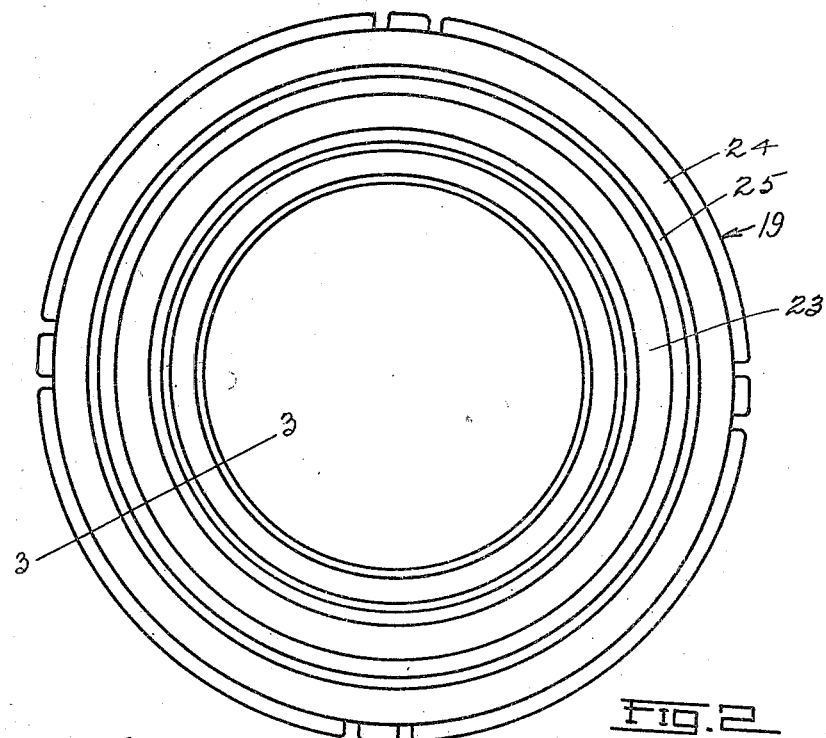
Figure 3:
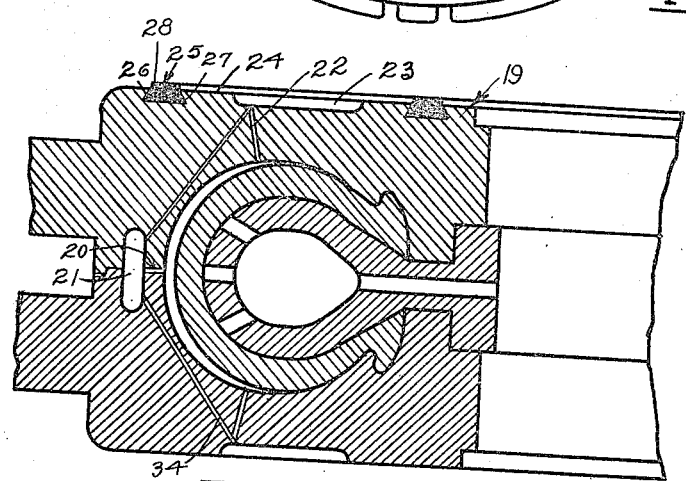

My invention relates to vulcanizing apparatus and the principal object of my invention is to provide new and improved apparatus of this sort. In the drawings accompanying this specification and forming a part thereof I have shown, for purposes of illustration, one form which my invention may assume. In these drawings:

Figure 1 is a vertical section of a heater showing this illustrative embodiment of my invention, Figure 2 is a plan view of the mold shown in Figure 1, while Figure 3 is a section on the line 3—3 of Figure 2.

In the drawings I have shown a heater 11 comprising a shell 12 supporting a top ring 13, a ram 15 supporting a table 16 which carries an annular plate 17, and a heater cover 14 carrying a similar annular plate 18 and provided with a duct 32 connecting the lower surface of the plate 18 with the exterior of the heater and controlled by a suitable valve 33. Between the plates 17 and 18 are clamped a plurality of molds 19.

Each of the molds is provided with a plurality of vents 20 terminating in a channel 21 cut in the two halves of the mold 19 and closed when the mold is closed, with two series of side vents 22 each terminating in a channel 23, and with ducts 34 connecting each channel 23 with the channel 21. The upper face 24 of each mold 19 is provided with a pair of packing rings 25 flanking the channel 23 therein and each comprising a dovetail portion 26 adapted to seat in a corresponding depression 27 in the mold 19 and a projecting portion 28 adapted to engage the surface of an abutting body. The plate 17 of the table 16 is provided with similar rings.

In carrying out certain processes of vulcanization wherein pressure is applied to the interior of the article during vulcanization it is customary to protect the vent holes from the action of this pressure and this is ordinarily done by confining the pressure within a duct. I find that this same result may be accomplished by segregating the vents. It will be apparent that in the apparatus just described the vents are all segregated from the open space within the heater and by means of the connecting ducts 34 and the connections between abutting molds are all connected to the channel 23 of the mold 19 and thence through the duct 32 to the exterior of the heater. Accordingly it will be apparent that the apparatus herein disclosed accomplishes the segregation of the vents. Under certain conditions it may be desired to apply vacuum to the exterior of the articles being molded and it will be apparent that the apparatus herein disclosed provides facilities for the operation.

While I have described herein one embodiment of my invention the disclosure herein is illustrative only and my invention is not limited thereto.

I claim:

1. A mold provided with a system of vents and ducts so arranged that said vents open through interconnected regions on the faces of the mold.

2. A mold provided with a series of vents opening through regions on one face thereof, a second series opening through a region on the opposite face thereof, and a duct interconnecting the regions.

3. A mold provided with a series of vents opening through a region on one face thereof, a second series opening through a region on the opposite face thereof, a third series opening into a closed chamber, and ducts interconnecting said regions and chamber.

4. A heater cover provided with a plate and with a duct leading from the lower surface of said plate to the exterior of said cover.

5. A heater cover provided with an annular plate and with a duct leading from the lower surface of said plate to the exterior of said cover.

6. A plurality of superimposed molds each provided with a system of vents and ducts so arranged that the vents thereof open through interconnected regions each adapted to abut a cooperating region on an abutting mold.

7. A plurality of superimposed molds each provided with a series of vents through a region on each abutting face thereof adapted to be abutted to a cooperating region on the abutting face of an abutting mold, and with a duct interconnecting the regions of each mold.

8. A plurality of superimposed molds each provided with a series of vents through a region on each abutting face thereof adapted to be abutted to a cooperating region on the abutting face of an abutting mold, a series of vents opening into a closed chamber within each mold, and ducts interconnecting the chamber and regions of said mold.

9. The combination as in claim 6, in combination with plates abutting the regions on the exposed faces of the end molds.

10. The combination as in claim 6, in combination with a plate abutting the region on the exposed face of one end mold, a plate abutting the region on the exposed face of the other end mold and apertured opposite said region, and a duct connecting said aperture to the exterior of an enclosing heater.

11. The combination as in claim 6, in combination with a plate abutting the region on the exposed face of one end mold, a similar plate unitary with the heater cover abutting the region on the exposed face of the other end mold and apertured opposite said region, and a duct through said heater cover connecting said aperture to the exterior of the heater.

12. The combination as in claim 7 in combination with plates abutting the regions on the exposed faces of the end molds.

13. The combination as in claim 7, in combination with a plate abutting the region on the exposed face of one end mold, a plate abutting the region on the exposed face of the other end mold and apertured opposite said region, and a duct connecting said aperture to the exterior of an enclosing heater.

14. The combination as in claim 7, in combination with a plate abutting the region of the exposed face of one end mold, a similar plate unitary with the heater cover abutting the region on the exposed face of the other end mold and apertured opposite said region, and a duct through said heater cover connecting said aperture to the exterior of the heater.

15. The combination as in claim 8, in combination with plates abutting the regions on the exposed faces of the end mold.

16. The combination as in claim 8, in combination with a plate abutting the region on the exposed face of one end mold, a plate abutting the region on the exposed face of the other end mold and apertured opposite said region, and a duct connecting said aperture to the exterior of an enclosing heater.

17. The combination as in claim 8, in combination with a plate abutting the region on the exposed face of one end mold, a similar plate unitary with the heater cover abutting the region on the exposed face of the other end mold and apertured opposite said region, and a duct through said heater cover connecting said aperture to the exterior of the heater.

In testimony whereof I have signed my name to the above specification.

DANIEL EDWARD HENNESSY.